US010100924B2

United States Patent
Schiele et al.

(10) Patent No.: US 10,100,924 B2
(45) Date of Patent: Oct. 16, 2018

(54) HYDRAULIC CONTROL ARRANGEMENT FOR AN AUTOMATIC TRANSMISSION

(71) Applicant: ZF Friedrichshafen AG, Friedrichshafen (DE)

(72) Inventors: Peter Schiele, Kressbronn (DE); Frank Gethöfer, Neukirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/902,019

(22) PCT Filed: Jun. 3, 2014

(86) PCT No.: PCT/EP2014/061427
§ 371 (c)(1),
(2) Date: Dec. 30, 2015

(87) PCT Pub. No.: WO2015/000653
PCT Pub. Date: Jan. 8, 2015

(65) Prior Publication Data
US 2016/0153551 A1  Jun. 2, 2016

(30) Foreign Application Priority Data
Jul. 3, 2013 (DE) ......................... 10 2013 212 947

(51) Int. Cl.
*F16H 61/02* (2006.01)
*F16H 61/06* (2006.01)
(Continued)

(52) U.S. Cl.
CPC ......... *F16H 61/0276* (2013.01); *F04C 14/26* (2013.01); *F04C 14/265* (2013.01);
(Continued)

(58) Field of Classification Search
CPC ..... F16D 2048/0221; F16H 2061/0279; F16H 61/0276; F16H 61/023; F16H 61/068;
(Continued)

(56) References Cited

U.S. PATENT DOCUMENTS

| 6,544,139 B1 | 4/2003 | Gierer et al. |
| 7,059,579 B2 | 6/2006 | Stevenson |

(Continued)

FOREIGN PATENT DOCUMENTS

| DE | 2705674 A1 | 8/1978 |
| DE | 19858541 A1 | 6/2000 |
| DE | 102005051606 A1 | 5/2006 |

OTHER PUBLICATIONS

German Patent Office Search Report, dated Mar. 25, 2014.
PCT International Search Report and Written Opinion, dated Jun. 3, 2014.

*Primary Examiner* — Atif Chaudry
(74) *Attorney, Agent, or Firm* — Dority & Manning, P.A.

(57) ABSTRACT

A hydraulic control device for an automatic transmission including a valve device. The valve device comprising a switching valve, featuring a switching component and a check valve. The switching valve is formed in a housing and is hydraulically connected to a first pressure adjusting device and a second pressure adjusting device along with a shift element for transferring a certain torque. The switching valve is formed as a directional seat valve.

15 Claims, 4 Drawing Sheets

(51) Int. Cl.
*F16K 15/18* (2006.01)
*F16K 17/04* (2006.01)
*F16K 31/122* (2006.01)
*F04C 14/26* (2006.01)
*F16D 48/02* (2006.01)

(52) U.S. Cl.
CPC ....... *F16H 61/0283* (2013.01); *F16H 61/068* (2013.01); *F16K 15/18* (2013.01); *F16K 15/183* (2013.01); *F16K 17/048* (2013.01); *F16K 31/1221* (2013.01); *F16D 2048/0221* (2013.01); *F16H 2061/0279* (2013.01); *F16H 2061/062* (2013.01)

(58) Field of Classification Search
CPC ............. F16H 61/0283; F16K 31/1221; F16K 15/183; F16K 15/18; F16K 17/048; F04C 14/26; F04C 14/265
See application file for complete search history.

(56) References Cited

U.S. PATENT DOCUMENTS

| | | | | |
|---|---|---|---|---|
| 8,720,486 B2 * | 5/2014 | Uchida | ............... | F16K 17/0406 |
| | | | | 137/599.18 |
| 2013/0281253 A1 * | 10/2013 | Ross | ........................ | F16D 25/14 |
| | | | | 475/275 |

* cited by examiner

HYDRAULIC CONTROL ARRANGEMENT FOR AN AUTOMATIC TRANSMISSION

FIELD OF THE INVENTION

The invention relates to a hydraulic control device for an automatic transmission in a vehicle.

BACKGROUND OF THE INVENTION

For the presentation of various transmission ratio stages, automatic transmissions feature hydraulic shift elements, which are actuated by means of pressurization; that is, they are brought into an operating state in which a certain torque is transferable through the shift elements. For this purpose, a cylindrical space is to be filled with an operating medium, and subsequently a clutch piston is subjected to a certain pressure of the operating medium. The volume flow or pressure required for filling or pressurization is generated by a pump, which is driven by a drive unit of the automatic transmission. The amount of pressure is adjusted by a pressure adjusting device, whereas different pressure circuits may be present in the hydraulic system of a transmission. When the drive unit is at a standstill, the generation of pressure collapses, and the pressure in the hydraulic system of the automatic transmission decreases to zero or the ambient pressure, thus also in the hydraulic shift elements. In addition, the cylinder of the shift elements is at least partially emptied, such that, upon a renewed starting of the drive unit, the cylinders must initially be completely filled before the shift elements are actuated as desired and a transmission ratio stage may thus be engaged.

DE 198 58 541 A1 shows an electronic/hydraulic control device of a motor vehicle transmission to be automatically shifted with hydraulically actuated shift elements. The pressure source of the hydraulic system is a pump, which provides a volume flow of pressure medium, whereas the amount of the pressure is adjusted in the pressure medium by means of valves acting as pressure adjusting devices. The filling of each shift element is triggered by raising the switching pressure, which moves a piston slide of a clutch valve into a switching position, in which the clutch is filled through the switching valve from ultimately the pressure source. If the drive unit that drives the pump is turned off and the control device is depressurized, the clutch valve is moved to a position at which the hydraulic connection of the clutch to the pressure source is interrupted, and a hydraulic connection of the clutch to a check valve is established. The check valve prevents the emptying of the clutch after, due to the outflow from the clutch through the check valve to an unpressurized chamber of the transmission, the clutch pressure has been reduced to a certain residual pressure value. By doing so, a defined residual pressure value in the clutch is adjusted. Ambient pressure prevails under a non-pressurized chamber, hereinafter referred to as a vented area.

The disadvantage here is that the residual pressure in the clutch is gradually eliminated through the gap leakage caused by its design, and that the clutch can thus be drained, since the clutch valve is designed as a piston slide valve. In addition, the valve device consists of a clutch valve for each shift element and a separate check valve, by which a high number of parts and additional installation space with a corresponding channel guide is required.

SUMMARY OF THE INVENTION

A task underlying the invention is to create a hydraulic control device for the reliable adjustment of a certain residual pressure in a shift element in a manner that is as simple as possible, with little structural outlay and minimal space requirements. Additional objects and advantages of the invention will be set forth in part in the following description, or may be obvious from the description, or may be learned through practice of the invention.

A hydraulic control device for an automatic transmission features at least one valve device, whereas the valve device comprises a switching valve, which features a switching component, and a check valve. Thereby, the switching valve is formed in a housing and is hydraulically connected to a first and a second pressure adjusting device along with a shift element for transferring a certain torque, whereas the pressure adjusting devices are provided with a pressure medium by at least one pump. Under the effect of a certain switching pressure at the switching component generated by the second pressure adjusting device, this can be moved into a first switching position, at which the first pressure adjusting device is hydraulically connected through the switching valve to the shift element, such that the filling of the shift element through the first pressure adjusting device is possible. At a switching pressure below a certain value, the switching component is in a second switching position, at which the inflow of the first pressure adjusting device at the shift element is interrupted. The check valve is arranged in such a manner that, in the second switching position of the switching component, it can flow through from the side of the shift element to a vented area of the hydraulic control device. Thereby, a "vented area" is understood to mean an area of the hydraulic control device, in which ambient pressure prevails. In accordance with the invention, the switching valve is formed as a directional seat valve. A "directional seat valve" is understood to mean a seat valve that can be switched into different switching positions.

Advantageously, a seat valve features a high degree of tightness with a simple structure, in contrast to a slide valve, which in principle is not tight, because of gap leakage caused by its design.

Advantageous arrangements of the invention are described herein.

In an advantageous embodiment of the hydraulic control device, the check valve is arranged in the switching component of the switching valve. An advantage of this integration of the check valve in the switching valve is a small need for area and/or installation space.

Alternatively, it is possible that the check valve and the switching valve are arranged separately in the housing of the hydraulic control device.

In a preferred embodiment of the invention, it is possible for both preceding variants that the switching component is formed as a seat piston, which features a first and a second cylindrical piston section, whereas the first piston section features a diameter that is smaller than the second piston section. Between the piston sections, a radially extending annular surface arises from the difference between the two diameters; this forms a switching pressure surface.

In this connection, it is possible that the seat piston is guided in an axially displaceable manner into a stepped bore formed in the housing, whereas, in the first switching position with a first end, the seat piston abuts on a stop and, in the second switching position with a second end, abuts on a valve seat formed in the housing. Thereby, the stepped bore is essentially radially penetrated by at least one coupling channel, one supply channel and one switching pressure channel. The switching pressure channel is arranged in such a manner that the switching pressure surface of the seat piston in each axial position of the seat piston is subjected to the switching pressure acting in the switching pressure channel.

Moreover, it is possible that the switching valve features, in addition to the seat piston, a pressure spring, which is arranged between the seat piston and the stop firmly connected to the housing, whereas, upon the pressurization of the switching pressure surface by the switching pressure, the switching component is displaceable in the direction of a central axis of the switching valve against the force of a switching valve spring against the fixed-housing stop in the first switching position, and whereas, with an unpressurized switching pressure channel, the seat piston occupies the second switching position, due to the force of the switching valve spring.

One advantageous embodiment shows that the check valve is formed as a seat valve, whereas this features a check valve-seat piston and a check valve spring. The check valve spring is arranged between a check valve stop and the check valve-seat piston, by which the closing force at the check valve-seat piston is effective in the direction of a check valve seat.

In an advantageous variant of the hydraulic control device, the check valve stop and the check valve seat are formed in the seat piston of the switching valve.

Alternatively, it is possible that the check valve stop and the check valve seat are formed in the housing of the hydraulic control device.

In a possible embodiment, the seat piston of the switching valve occupies a second switching position only if the second pressure adjusting device is vented. The hydraulic control device is formed in such a manner that, in the second switching position above a certain clutch pressure value, starting from the shift element, the check valve can flow through either to the depressurized second pressure adjusting device or, if this is depressurized, to the first pressure adjusting device. The check valve is blocked against a flow from the pressure adjusting device flowing in through the check valve to the shift element.

In a possible embodiment, in the second switching position of the switching valve, the shift element is hydraulically connected through the check valve that can flow through from the shift element and a connection channel formed in the switching component to the second (vented) pressure adjusting device.

In an alternative embodiment, in the second switching position of the switching valve, the shift element is hydraulically connected through the check valve that can flow through from the shift element and a connection channel formed in the switching component to the first (vented) pressure adjusting device.

In an additional alternative embodiment, in the second switching position of the switching valve, the shift element is hydraulically connected through the check valve that can flow through from the shift element and a connection channel formed in the housing to the first (vented) pressure adjusting device.

As an alternative to the aforementioned embodiment, it is provided that, in the second switching position of the switching valve, the shift element is hydraulically connected through the check valve and a connection channel formed in the housing to the vented second pressure adjusting device.

In this connection, it is provided that an automatic transmission features a hydraulic control device in accordance with the invention or corresponding to the preceding embodiments.

BRIEF DESCRIPTION OF THE DRAWINGS

Embodiments of the method in accordance with the invention are presented in the drawings, and will be described in more detail below.

The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
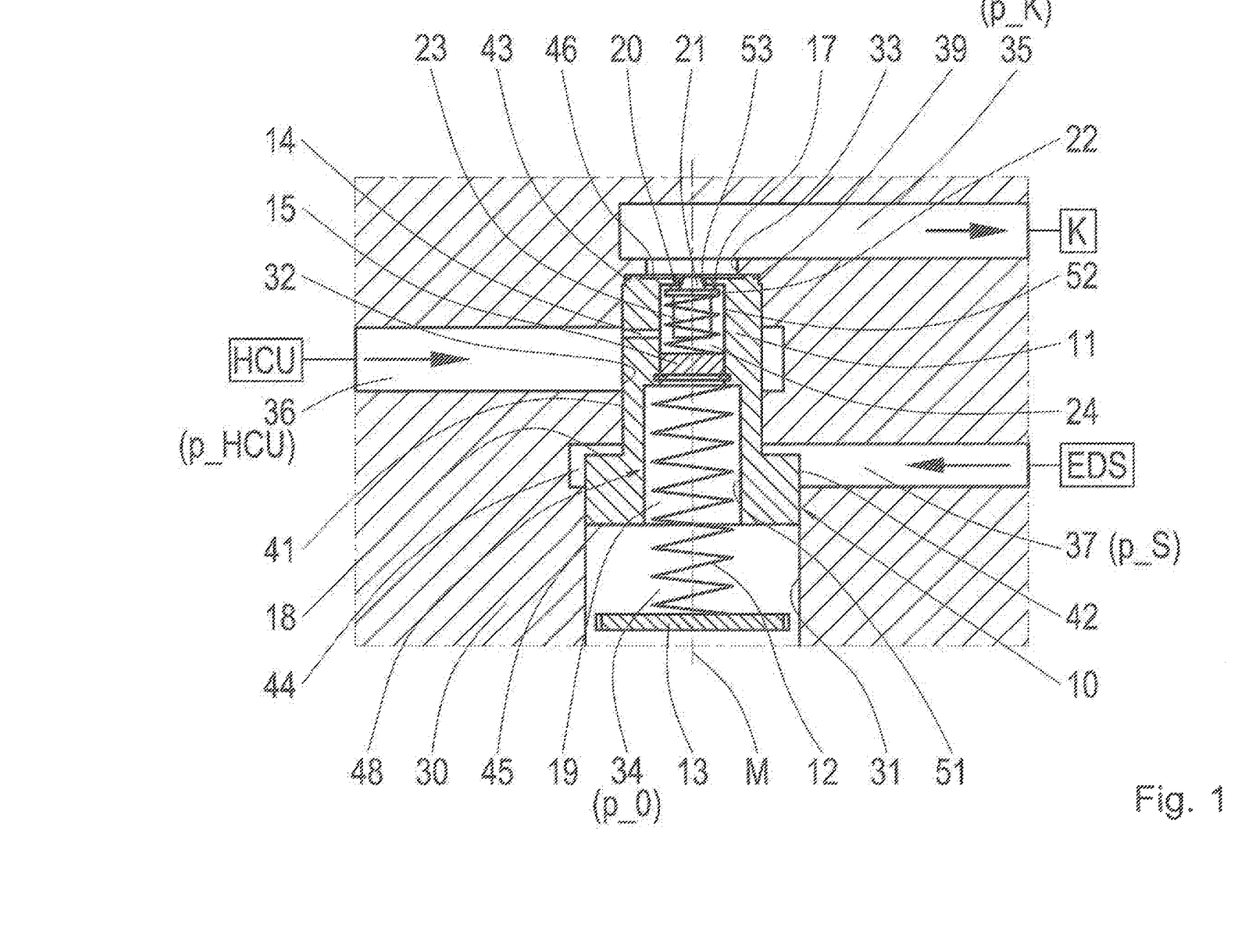
FIG. 1 is a schematic sectional view of a first variant of a hydraulic control device in accordance with the invention in the second switching position.

FIG. 1 shows a schematic view of the hydraulic control device in accordance with the invention with a switching valve 10 and a check valve 20 in the first switching position of the switching valve 10. The switching valve 10 comprises a switching component formed as a seat piston 11, whereas the seat piston 11 features a first cylindrical piston section 41 and a second cylindrical piston section 42. Thereby, the diameter of the first piston section 41 is smaller than that of the second piston section 42. Between the piston sections, an annular switching pressure surface 18 extending in a radial direction is formed; its surface is derived from the difference of the cross-sectional surfaces of the piston sections 41 and 42. In a housing 30 of the hydraulic control device, the seat piston 11 is led into a stepped bore 38, which features in an axial manner a first bore section 31, a second bore section 32 and a third bore section 33, i.e. concentrically at a central axis M. Thereby, the housing of the hydraulic control device can be formed by the transmission housing, a housing of an electro-hydraulic control unit, or any transmission component. Preferably, the housing of the hydraulic control apparatus can also be formed by a supply line to a shift element, for supplying a pressure medium in the shift element.

In this connection, the terms "axial" and "radial" always refer to the central axis M. In the area of the first bore section 31 that features the largest diameter of all of the bore sections, the stepped bore 38 penetrates from a switching pressure channel 37 in an essentially radial manner; that is, approximately perpendicular to the central axis M. As a result, a pressure chamber 44 is formed, in which the first bore section 31 merges into the second bore section 32. The switching pressure channel 37 connects the hydraulic control device with a first pressure adjusting device, and a switching pressure control EDS (hereinafter also abbreviated with EDS). The switching pressure $p\_S$ prevails both in the pressure chamber 44 and the switching pressure channel 37. Through the third bore section 33, whose diameter is smaller than that of the second bore section 32, an annular surface, which extends radially, is formed between the two bore sections 32 and 33. Such annular surface forms a valve seat 39. At the end of the stepped bore 38, its third bore section 33 is penetrated by a coupling channel 35, through which the hydraulic control device is connected to a shift element, in this case a clutch K, essentially perpendicular to the central axis M. A clutch pressure p_K prevails both in the coupling channel 35 and the clutch K. The second bore section 32 is penetrated by a supply channel 36 essentially perpendicular to the central axis M, through which the clutch K can be supplied with a pressure medium from an electro-hydraulic control unit HCU acting as the second pressure adjusting device (hereinafter, "HCU"). A control pressure p_HCU adjusted by the HCU prevails in the supply pressure channel 36. During the hydraulic connection between the HCU and the clutch K, the amount of the clutch pressure p_K corresponds to the control pressure p_HCU.

The seat piston 11 is penetrated in an axial direction by a stepped bore 48, which is formed by three bore sections 51, 52 and 53, with different diameters. The bore section 51 features the largest diameter, and is open at a first end of the seat piston 45. The bore section 51 forms a spring chamber 19, which extends within the first and second piston sections 41 and 42 and in which a pressure spring 12 is arranged. From the bore section 52 adjoining the spring chamber 19, a check valve chamber 24 is radially bounded in the second piston section 42. At a second end of the seat piston 46, the stepped bore 48 opens into the third bore section 53. The transition from the third bore section 53 to the second bore section 52 forms a radially extending annular surface as the difference between the diameters of the second bore section 52 and the third bore section 53. Such annular surface forms a check valve seat 17.

The check valve 20 comprises a check valve piston 21 and a check valve spring 23. The check valve piston 21 is a cylindrically formed body, which in a specific position abuts on the check valve seat 17, and thereby closes the opening formed by the third bore section 53 in the second end of the seat piston 46. As an alternative to the cylindrical shape, the check valve piston can also be formed in a spherical shape. The housing of the check valve 20, which includes the check valve chamber 24, is formed by the seat piston 11 and a check valve stop 15. The check valve stop 15 is secured in the seat piston 11 or is firmly connected to it, as the case may be. The check valve stop 15 is inserted in the stepped bore 48 or the seat piston 11, as the case may be, in such a manner that the check valve chamber 24 and the spring chamber 19 are sealed against each other. In principle, the check valve stop 15 need not be a separate component, which requires an assembly process or pressing process, but can also be formed by a corresponding machining, such as the manufacturing of the spring chamber 19 and the check valve chamber 24 through a machining of the seat piston 11 from each end. The check valve spring 23 is arranged between the check valve stop 15 and the check valve piston 21. The length of the check valve spring 23 is selected in such a manner that it is already preloaded if the check valve piston 21 abuts on the check valve seat 17. The seat piston 11 features a radially directed connection channel 14, through which the check valve chamber 24 is connected to the outer environment of the seat piston 11 or the piston section 41, as the case may be.

In the position of the directional seat valve 10 and the check valve 20 shown in FIG. 1, the hydraulic connection between the electro-hydraulic control unit HCU and the clutch K is interrupted, whereby the switching valve occupies its second switching position. The seat piston 11 is pressed by the pressure spring 12 with one end 45 against the valve seat 39, whereas the pressure spring 12 is preloaded between the seat piston 11 and a fixed-housing stop 13. In contrast to the check valve stop 15, the stop 13 is permeable for the operating medium.

Between the seat piston 11 and the stop 13, a ventilation chamber 34 is formed; this is usually connected by the stop 13 to an area of the hydraulic control device in which a pressure that is lower than the switching pressure p_S generally prevails. In most cases, as in this embodiment, a venting pressure p_0, which corresponds to the ambient pressure, prevails. The check valve-seat piston 21 abuts on the check valve seat 17, such that the check valve 20 is closed.

The second switching position that is shown is then occupied by the seat piston 11, if at least the switching pressure channel 37 is depressurized (switching pressure p_S=p_0), or if the switching pressure p_S is so low that the compressive force acting on the seat piston 11 through the switching pressure surface 18 is smaller than the preload force of the pressure spring 12, which presses the seat piston 11 against the valve seat 39. If the supply pressure channel 36 is also depressurized (control pressure p_HCU=p_0), the clutch pressure p_K acts from a certain clutch pressure value p_K*, which is determined by the closing force of the check valve spring, opening at the check valve 20, which, based on its arrangement and configuration, permits only one flow of the clutch K to the electro-hydraulic control unit HCU. The clutch K is then connected to the vented HCU by the coupling channel 35, the bore section 33, the check valve chamber 24, the connection channel 14 and the supply pressure channel 36, such that the clutch pressure p_K falls to a residual pressure value corresponding to the clutch pressure value p_K*.

If, in the position shown of the seat piston 11, the clutch K is depressurized (clutch pressure p_K=p_0) or is not filled with an operating medium, even with an existing control pressure p_HCU, this cannot be filled from the electro-hydraulic control unit HCU, since the check valve 20 is blocked in this flow direction and does not permit a flow.

If, for example, when turning off the drive motor of the vehicle, the pump P driven by the motor comes to a standstill, both the pressure supply channel 36 and the switching pressure channel 37 are vented; that is, both the control pressure p_HCU and the switching pressure p_S correspond to the ambient pressure p_0.

Figure 2:
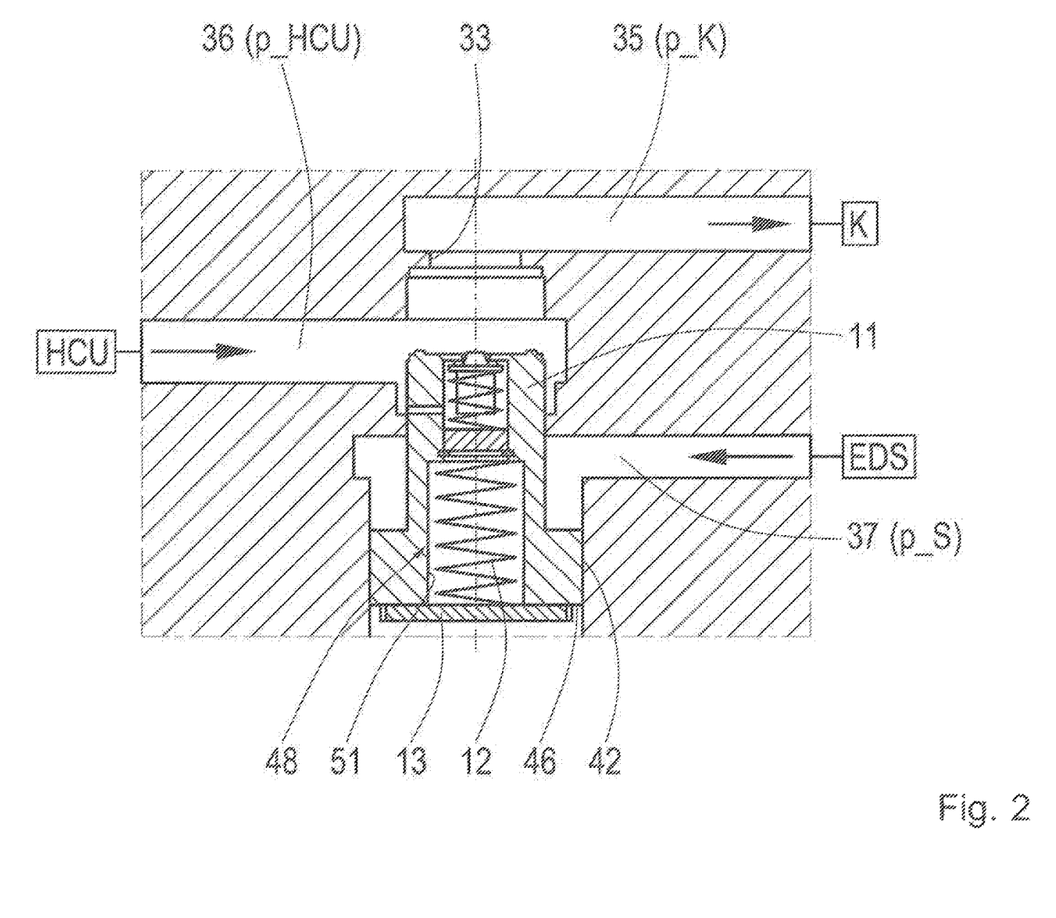
FIG. 2 is a schematic sectional view of a first variant of a hydraulic control device in accordance with the invention in the first switching position.

Under the action of the switching pressure p_S, the seat piston 11 occupies the position shown in FIG. 2. The HCU and the clutch K, or the supply pressure channel 36 and the coupling channel 35, as the case may be, are connected to each other through the bore section 33, such that the clutch is filled K from the HCU, and is subjected to the control pressure p_HCU, such that the clutch pressure p_K corresponds to the control pressure p_HCU. With an end of the seat piston 46, the seat piston 11 abuts on the stop 13. If the seat piston 11 is to be moved back into the position shown in FIG. 1, the switching pressure channel 37 is to be vented (switching pressure p_S=p_0), or the switching pressure p_S is to be lowered at least to the extent that the force of pressure spring 12 exceeds the hydraulic force from the control pressure p_S. If, in addition to the switching pressure channel 37, the supply pressure port 36 is also vented (p_S=p_HCU=p_0), the operating medium under pressure in the clutch K and the coupling channel 35 leaks through the check valve 20 into the vented supply pressure channel 36 and the clutch pressure p_K lowers to the clutch pressure value p_K*, which is adjusted by the check valve 20.

Figure 3:
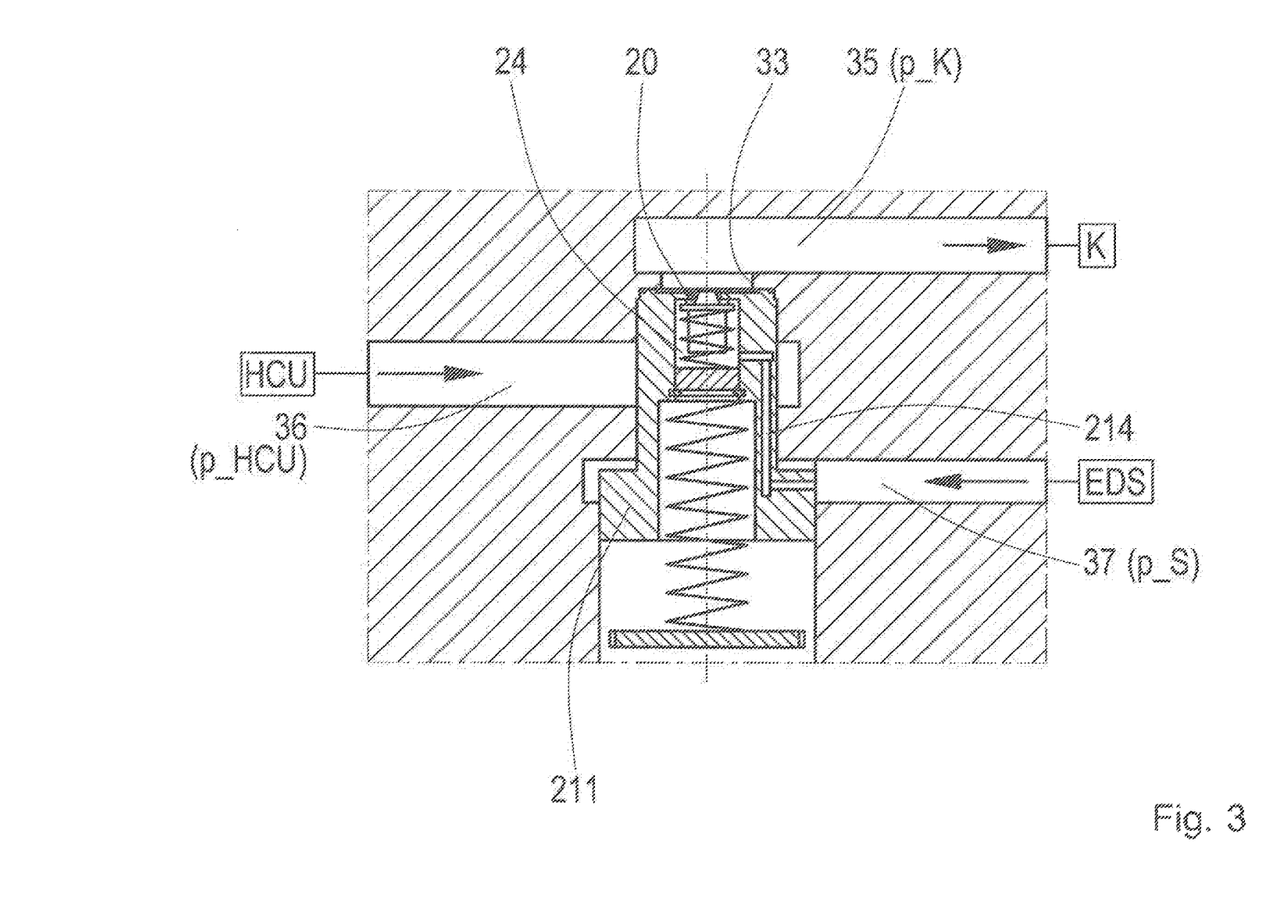
FIG. 3 is a schematic sectional view of a second variant of a hydraulic control device in accordance with the invention with the switching valve in the second switching position.

FIG. 3 shows in a schematic sectional view of an alternative embodiment of a seat piston 211, whereas this is located in a position at which an end of the seat piston 246 comes to the valve seat 39 and separates the HCU from the clutch K. The seat piston 211 differs from the seat piston 11 from FIGS. 1 and 2 by the fact that the check valve chamber 24 does not lead through a connection channel 214 to the outer contour of a piston section 241, but to the outer contour of a piston section 242, in a radial direction to its outer environment, namely in the switching pressure channel 37. In the position shown of the seat piston 211, the switching pressure channel 37 is depressurized (p_S=p_0) or the switching pressure p_S is at least so low that the force of a pressure spring 212 is sufficient to press the seat piston 211 against the switching pressure p_S and the clutch pressure p_K into the position shown. From a certain clutch pressure value p_K*, which must be higher than the switching pressure p_S, the check valve-seat piston 21 is moved against the force of the check valve spring 23. Thereby, the clutch K is connected to the EDS through the coupling channel 35, the bore section 33, the check valve 20, or the check valve chamber 24, the connection channel 214 and the switching pressure channel 37, as the case may be, and/or is vented if the switching pressure channel 37 is depressurized (p_K=p_S=p_0).

Figure 4:
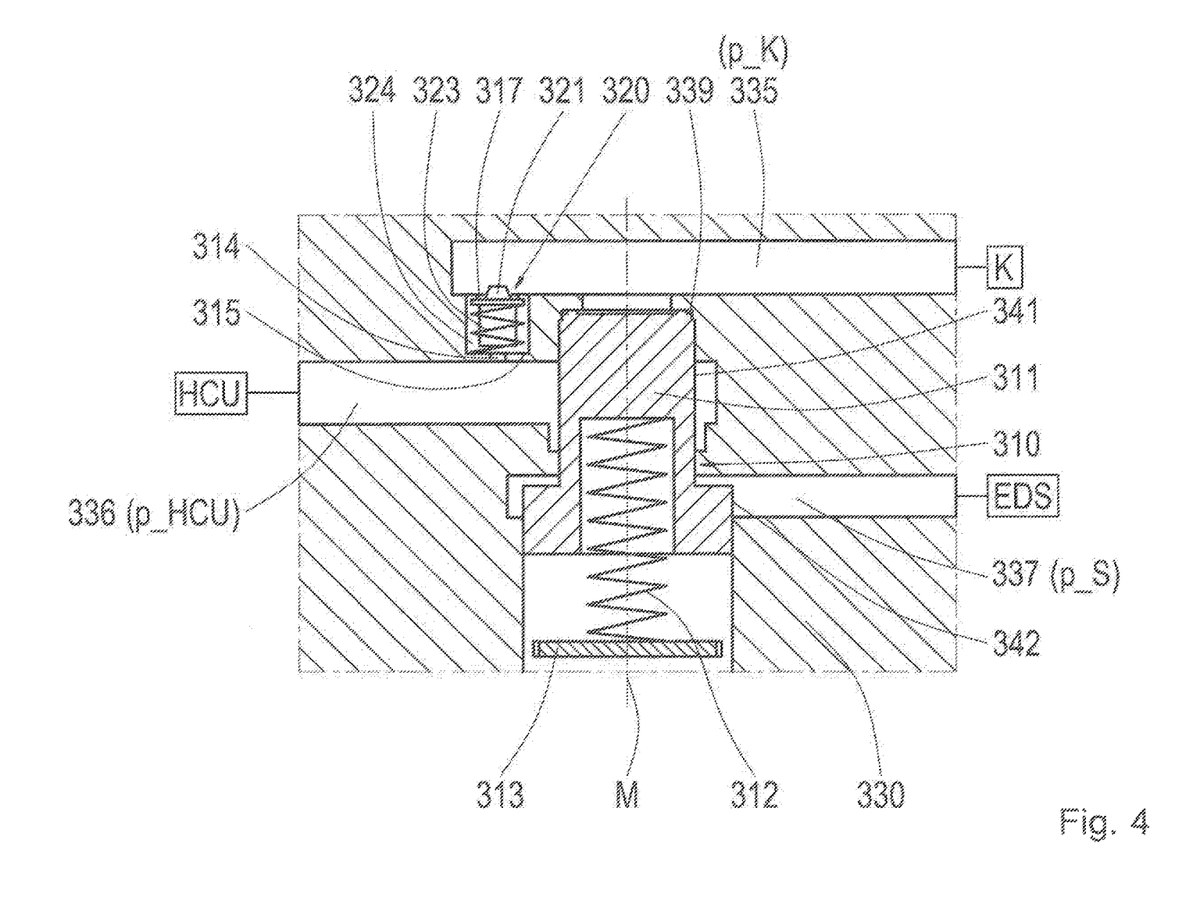
FIG. 4 is a schematic sectional view of a third variant of a hydraulic control device in accordance with the invention with the switching valve in the second switching position.

FIG. 4 shows an additional alternative embodiment of a hydraulic control apparatus in a schematic sectional view. In contrast to the seat piston 11 or 211, as the case may be, in FIGS. 1 to 3, the check valve is not arranged within the respective seat piston, but is separate from the directional seat valve in a housing 330. Thereby, the structure of the seat piston is easier compared to a seat piston with an integrated check valve.

The outer contour of a seat piston 311, with the piston sections 341 and 342, is identical to the outer contour of the seat piston 11 and 211 from FIGS. 1 to 3, and features a similar pressure spring 312, which is clamped between the seat piston 311 and a stop 313. A check valve 320 is arranged between a coupling channel 335 and a supply pressure channel 336; this is formed in such a manner that a flowing through can take place from the coupling channel 335 into the supply pressure channel 336 only as soon as the clutch pressure p_K exceeds a clutch pressure value p_K* and the control pressure p_HCU is less than the clutch pressure value p_K*. A filling of the clutch K from the HCU is only possible if the switching pressure p_S is so high that it switches the seat piston 311 into a second position, in which the supply pressure channel 336 and the coupling channel 335 are connected to each other by a bore section 333.

The check valve 320 is formed in the housing 330, whereas a check valve-seat piston 321 is arranged within a check valve chamber 324 that is formed, for example, as a bore. In the unpressurized state of the hydraulic control device, the check valve-seat piston 321 is pressed by a check valve spring 323 against a check valve seat 317. The check valve spring 323 is clamped between the check valve-seat piston 321 and a check valve stop 315. Through the check valve stop 315, a connection channel 314 connects the check valve chamber 324 to the supply pressure channel 336. Alternatively, the check valve could also be arranged between the coupling channel 335 and the switching pressure channel 337.

Modifications and variations can be made to the embodiments illustrated or described herein without departing from the scope and spirit of the invention as set forth in the appended claims.

REFERENCE SIGNS

10 Switching valve
11 Seat piston
12 Pressure spring
13 Stop
14 Connection channel
15 Check valve stop
17 Check valve seat
18 Switching pressure surface
19 Spring chamber
20 Check valve
21 Check valve-seat piston
22 Sealing element
23 Check valve spring
24 Check valve chamber
25 Housing
31 Bore section
32 Bore section
33 Bore section
34 Ventilation chamber
35 Coupling channel
36 Supply pressure channel
37 Switching pressure channel
38 Stepped bore
39 Valve seat
41 Piston section
42 Piston section
43 Piston section
44 Pressure chamber
45 End of the seat piston
46 End of the seat piston
48 Stepped bore
51 Bore section
52 Bore section
53 Bore section
211 Seat piston
212 Pressure spring
214 Connection channel
241 Piston section
242 Piston section
246 End of the seat piston
310 Directional seat valve
311 Seat piston
312 Pressure spring
313 Stop
314 Connection channel
315 Check valve stop
317 Check valve seat
320 Check valve
321 Check valve-seat piston
323 Check valve spring
324 Check valve chamber
330 Housing
335 Coupling channel
336 Supply pressure channel
337 Switching pressure channel
339 Valve seat
341 Piston section
342 Piston section
EDS Switching pressure control
HCU Electro-hydraulic control unit K Clutch
P Pump
p_HCU Control pressure
p_K Clutch pressure
p_K* Clutch pressure value
p_S Switching pressure
p_0 Venting pressure, ambient pressure

The invention claimed is:

1. A hydraulic control device for an automatic transmission, comprising:
a housing:
a valve device, the valve device further comprising:
a switching valve (10) formed in the housing and hydraulically connected through the housing to a first pressure adjusting device (HCU) and a second pressure adjusting device (EDS), the switching valve also connected to a shift element (K) that transfers torque in the automatic transmission;
a switching component (11);
a check valve (20);
wherein the pressure adjusting devices (HCU, EDS) are supplied with a pressure medium and, under effect of a switching pressure (p_S) at the switching component (11) generated by the second pressure adjusting device (EDS), the switching component (11) is moved into and held at a first switching position where the first pressure adjusting device (HCU) is hydraulically connected through the switching valve (10) to the shift element (K) such that a flow of pressure medium from the first pressure device (HCU) is supplied to the shift element (K);
wherein below a certain value of the switching pressure (p_S), the switching component (11) is moved to a second switching position where inflow of the pressure medium from the first pressure adjusting device (HCU) at the shift element (K) is interrupted;
the check valve (20) arranged such that, in the second switching position of the switching component (11), the pressure medium flows from the shift element (K) through the check valve (20) to a vented area of the hydraulic control device; and
the switching valve (10) formed as a directional seat valve.

2. The hydraulic control device according to claim 1, wherein the check valve (20) is arranged in the switching component (11) of the switching valve (10).

3. The hydraulic control device according to claim 1, wherein the check valve (320) and the switching valve (310) are arranged separately in the housing (330) of the hydraulic control device.

4. The hydraulic control device according to claim 1, wherein the switching component comprises a seat piston (11) having a first and a second cylindrical piston section (41, 42), the first piston section (41) having a diameter that is smaller than a diameter of the second piston section (42), the seat piston further comprising a radially extending annular surface between the first and second piston sections (41, 42) resulting from a difference between the two diameters, the annular surface defining a switching pressure surface (18).

5. The hydraulic control device according to claim 4, wherein:
the seat piston (11) is guided in an axially displaceable manner into a stepped bore (38) formed in the housing (30);
in the first switching position, a first end (45) of the seat piston (11) abuts on a stop (13);
in the second switching position, a second end (46) of the seat piston abuts on a valve seat (39) formed in the housing (30);
the stepped bore (38) is radially penetrated by a coupling channel (35) to the shift element 9K), a supply channel (36) from the first pressure adjusting device (HCU), and a switching pressure channel (37) from the second pressure adjusting device (EDS); and
the switching pressure channel (37) arranged such that the switching pressure surface (18) of the seat piston (11) is subjected to the switching pressure (p_S) acting in the switching pressure channel (37) in each of the first and second switching positions of the seat piston (11).

6. The hydraulic control device according to claim 5, wherein the switching valve (10) further comprises:
a pressure spring (12) arranged between the seat piston (11) and the stop (13) fixed within the housing;
wherein upon pressurization of the switching pressure surface (18) by the switching pressure (p_S), the switching component (11) is displaceable in an axial direction of a central axis (M) of the switching valve (10) against a force of the pressure spring (12) in the first switching position; and
wherein with an unpressurized switching pressure channel (37) or a vented second pressure adjusting device (EDS), the seat piston (11) occupies the second switching position due to the force of the switching valve spring (12).

7. The hydraulic control device according to claim 1, wherein the check valve (20) is formed as a seat valve having a seat piston (21, 321) and a check valve spring (23) arranged between a check valve stop (15, 315) and the seat piston (21, 321), wherein a closing force of the check valve spring biases the seat piston (21, 321) in the direction of a check valve seat (17, 317).

8. The hydraulic control device according to claim 7, wherein the switching component comprises a seat piston (11), wherein the check valve stop (15) and the check valve seat (17) are formed in the seat piston (11) of the switching component.

9. The hydraulic control device according to claim 7, wherein the check valve stop (315) and the check valve seat (317) are formed in the housing (330) of the hydraulic control device.

10. The hydraulic control device according to claim 1, wherein in the second switching position of the switching component (11) and above a shift element pressure value (p_K*):
the check valve (20) permits pressure medium flow from the shift element (K) to the first or the second pressure adjusting device (EDS, HCU) if the pressure (p_S, p_HCU) of the respective pressure adjusting device is lower than the shift element pressure (p_K) or corresponds to ambient pressure (p_0); and
the check valve (20) blocks flow of the pressure medium from the respective pressure adjusting devices (EDS, HCU) to the shift element (K).

11. The hydraulic control device according to claim 10, wherein in the second switching position of the switching component (11), the shift element (K) is hydraulically connected through the check valve (20) and a connection channel (214) formed in the switching component (11) to the second pressure adjusting device (EDS).

12. The hydraulic control device according to claim 10, wherein in the second switching position of the switching component (11), the shift element (K) is hydraulically connected through the check valve (20) and a connection channel (14) formed in the switching component (11) to the first pressure adjusting device (HCU).

13. The hydraulic control device according to claim 10, wherein in the second switching position of the switching component (11), the shift element (K) is hydraulically connected through the check valve and a connection channel (314) formed in the housing (330) to the first pressure adjusting device (HCU).

14. The hydraulic control device according to claim 10, wherein in the second switching position of the switching component (11), the shift element is hydraulically connected through the check valve and a connection channel formed in the housing to the second pressure adjusting device.

15. An automatic transmission, comprising a hydraulic control device in accordance with claim 1.

\* \* \* \* \*